United States Patent [19]

Bergthaller et al.

[11] Patent Number: 4,474,854

[45] Date of Patent: Oct. 2, 1984

[54] PHOTOGRAPHIC MATERIAL CONTAINING A LAYER CAPABLE OF BEING DYED BY ORGANIC DYES

[75] Inventors: Peter Bergthaller; Jürgen Strauss, both of Cologne, Fed. Rep. of Germany

[73] Assignee: Agfa-Gevaert AG, Leverkusen, Fed. Rep. of Germany

[21] Appl. No.: 456,966

[22] Filed: Jan. 10, 1983

[30] Foreign Application Priority Data

Jan. 23, 1982 [DE] Fed. Rep. of Germany ....... 3202127

[51] Int. Cl.$^3$ ............ B32B 9/04

[52] U.S. Cl. ............ 428/411.1; 428/457; 428/913; 428/914; 430/214; 430/225; 430/241

[58] Field of Search ............ 430/214, 212, 225, 241; 260/932; 428/914, 457, 913

[56] References Cited

U.S. PATENT DOCUMENTS

| | | | |
|---|---|---|---|
| 2,870,190 | 1/1959 | Burgert et al. | 260/932 |
| 3,081,167 | 3/1963 | Goulston et al. | 430/225 |
| 3,227,550 | 1/1966 | Whitmore et al. | 430/241 |
| 3,443,940 | 5/1969 | Bloom et al. | 430/214 X |

*Primary Examiner*—Thomas J. Herbert
*Attorney, Agent, or Firm*—Connolly and Hutz

[57] ABSTRACT

In a photographic material suitable as image receptor element for the dye diffusion transfer process, a dye absorbent layer arranged on a layer support contains nickel chelates or copper-II chelates of a compound corresponding to the following general formula I as metallizing agents for the formation of colored complexes from colorless or colored organic complex formers. The chelatable image dyes transferred imagewise to the dye adsorbent layer in the course of development give rise to the corresponding nickel or copper-II complexes with improved light stability.

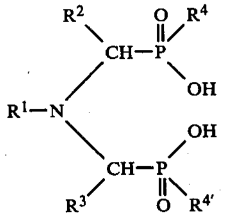

(I)

wherein $R^1$ represents a hydrocarbon group having up to 30 carbon atoms optionally interrupted by —O—;

$R^2$, $R^3$ represents H, alkyl having up to 5 carbon atoms or aryl having from 6 to 10 carbon atoms; and $R^4$, $R^{4'}$ represents alkyl or alkoxy having from 1 to 4 carbon atoms, aralkyl or OH.

6 Claims, No Drawings

PHOTOGRAPHIC MATERIAL CONTAINING A LAYER CAPABLE OF BEING DYED BY ORGANIC DYES

This invention relates to a photographic material in which a layer capable of absorbing organic dyes and arranged on a layer support contains a metallizing agent for the formation of organic dye-metal complexes. The present invention relates in particular to an image receptor element for the production of colour photographic images by the dye diffusion transfer process in which diffusible dyes capable of post-metallization are used for the production of the colour image. The metallizing agents used according to the present invention in the dye absorbent layer are nickel complexes or copper complexes of imino-bis-methylene-phosphinic or -phosphonic acids.

It is of particular interest to use polyvalent, in particular complex-forming metal cations in the image receptor layers for the photographic dye diffusion transfer process. As is well known, the dye diffusion transfer process, which is particularly important for instant colour photography, is carried out using a light-sensitive recording material containing several silver halide emulsion layers of differing spectral sensitivities and colour-providing compounds associated therewith. The colour-providing compounds used may be, for example, so-called dye developers; these are compounds which are originally diffusible and contain a chromophoric residue and a developer function which immobilizes the compounds imagewise in the process of development. The process may also be carried out using non-diffusible colour-providing compounds containing a chromophoric residue which is released imagewise in the process of development as a diffusible dye or dye precursor (dye releaser). If the chromophoric residue of the dye developer or dye releaser contains certain substituents capable of acting as ligands for complex formation with polyvalent metal cations, the complex formation may be used to improve the stability to light, influence the colour hue and fix the image dyes which have been transferred to the image receptor layer. Complex formation is preferably carried out only after dye transfer, either by treating the image receptor material with a solution of the complex-forming polyvalent metal cations, e.g. in the form of a solution of the corresponding salts, or by incorporating the polyvalent metal cations in one or more layers of the image receptor material so that they may instantly react with the dyes diffusing into the layer in the course of development to undergo complex formation therewith.

Research Disclosure No. 18534 (September 1979) describes polymers containing complex-bound polyvalent metal cations and the use thereof in image receptor layers of colour photographic materials for the dye diffusion transfer process. The polymers mentioned there, however, have only a limited capacity for absorbing polyvalent metal cations.

In EP-A No. 0 009 411 it is disclosed that cationic nickel or copper-II complexes of polyvinyl pyridine or polyvinyl imidazole may be used as metallizing agents for image dyes which are capable of post-complex formation. Although these complexes have little self colour at a neutral pH, they rapidly assume a dark colour at the pH of an alkaline processing medium, and this colour disappears only very slowly if at all and renders the image unsightly so long as it exists. At the same time, the coordinated hetero-aromatically-bound nitrogen atoms still attached to the dye-metal complex adversely affect the colour shade, particularly in the case of cyan dye complexes. There is in most cases an undesirable shift to the short region of the absorption band so that the colour shade is shifted towards blue.

The above-mentioned published European Patent Application further discloses that metal complexes of polymers with imino diacetic acid units may be used as metallizing agents. These metallizing agents are difficult to handle by the methods of polymer chemistry and, particularly in the case of latex polymers, are liable to undergo agglomeration.

It is an object of the present invention to provide a metallizing agent which may be introduced particularly easily into a dye absorbent layer of a photographic material, in particular an image receptor element for colour photographic images, by the diffusion process, and which contains nickel or copper-II ions in a diffusion resistant form, does not agglomerate with cationic mordants and has no adverse effects on the image produced, in particular no self colour which would impair the appearance of the image.

It has been found that metallizing agents which satisfy the requirements described above may be prepared particularly simply by reacting imino-bis-methylene-phosphinic or -phosphonic acids which are substituted on the nitrogen atom with nickel or copper-II salts. The water-insoluble nickel or copper-II complexes obtained may be added to the casting solutions for the dye absorbent layers in the form of aqueous dispersions, optionally in the presence of high boiling, water-insoluble oil-formers.

The present invention relates to a photographic material in which a layer capable of being dyed by organic dyes and arranged on a layer support contains a metallizing agent for the formation of organic dye-metal complexes, characterised in that the layer capable of being dyed by organic dyes contains, as metallizing agent, at least one water-insoluble nickel complex or copper-II complex formed from a compound corresponding to the following general formula I:

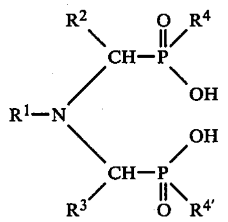

(I)

wherein $R^1$ represents a hydrocarbon group having up to 30 carbon atoms optionally interrupted by —O—;

$R^2$,$R^3$ represent H, alkyl having up to 5 carbon atoms or aryl having from 6 to 10 carbon atoms, preferably conforming to the condition that $R^3$ represents H or $R^2$ when $R^2$ represents alkyl or aryl;

$R^4$,$R^{4'}$ represent alkyl or alkoxy having from 1 to 4 carbon atoms, aralkyl or OH.

The groups $R^1$, $R^2$, $R^3$ and $R^4$ in general formula I function, inter alia, as ballast groups, that is to say the total size of all the groups $R^1$, $R^2$, $R^3$ and $R^4$ present in a compound is sufficient to ensure that the nickel or copper-II complexes formed from the compounds will be resistant to diffusion when incorporated in photographic layers.

The hydrocarbon groups represented by $R^1$ may be, for example, alkyl, aralkyl, cycloalkyl or aryl. The following are specific examples: ethyl, n-butyl, 2-ethylhexyl, n-dodecyl, n-octadecyl, benzyl, phenylethyl, phenyl, 4-dodecylphenyl and cyclohexyl. A hydrocarbon group interrupted by —O— may be, for example, an alkoxyalkyl group or an aroxyalkyl group; an example of this would be the 4-(2,4-bis-t-amyl-phenoxy)-butyl group.

An alkyl group represented by $R^2$, $R^3$ or $R^4$ ($R^{4'}$) may be, for example, methyl, ethyl, n-propyl or n-butyl.

Examples of aryl groups represented by $R^1$, $R^2$ and $R^3$ include phenyl and naphthyl which may in turn be substituted, e.g. by a group which has a ballast character, such as a n-hexadecyloxy group.

$R^2$ and $R^3$ preferably conform to at least one of the following two conditions:

(1) $R^2=R^3$ (2) at least one of the groups $R^2$ and $R^3$ represents H.

The OH groups present in general formula I or represented by $R^4$, $R^{4'}$ may be present in anionic form $(-O^{\ominus})$.

The following are typical examples of imino-bis-methylene phosphonic acids or imino-bis-methylene-phosphinic acids which may be used for the preparation of nickel or copper-II chelates suitable as metal donors in dye absorbent layers:

Compound 1

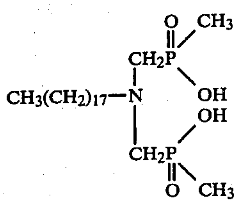

Compound 2

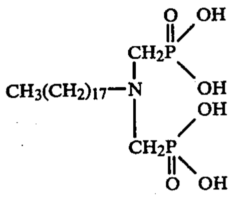

Compound 3

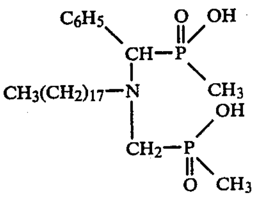

Compound 4

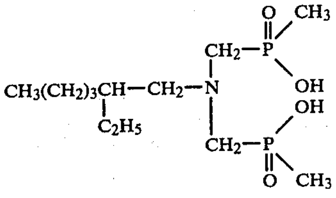

-continued

Compound 5

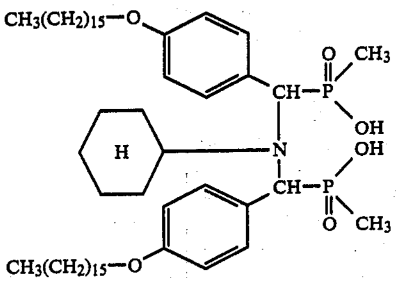

Compound 6

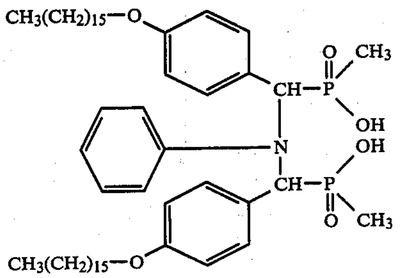

Compound 7

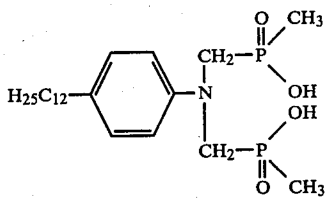

Compound 8

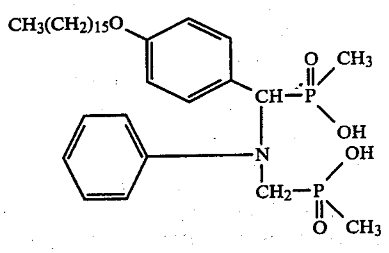

Compound 9

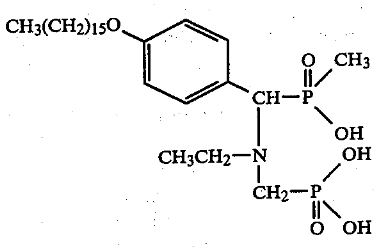

Compound 10

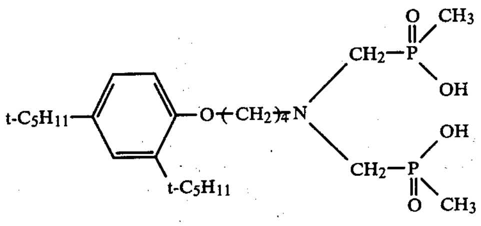

-continued

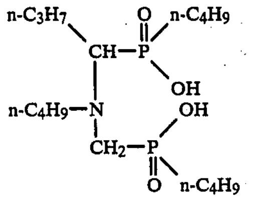

Compound 11

The synthesis of symmetric compounds corresponding to formula I ($R^2=R^3$) proceeds according to the following reaction equations:

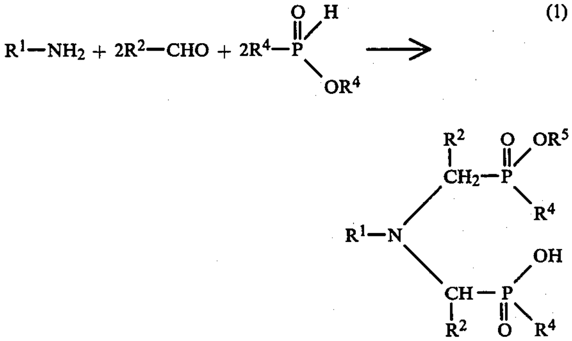

(1)

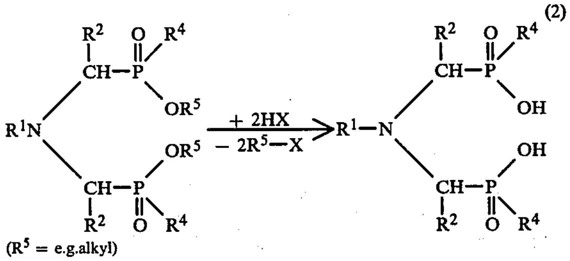

(2)

($R^5$ = e.g.alkyl)

Alternatively, asymmetric compounds may be prepared stepwise, for example by first reacting the amines $R^1—NH_2$ with a first carbonyl compound $R^2—CHO$ to form an azomethine and then reacting with a first phosphorous or phosphonous acid ester compound to form a N-substituted aminoalkane phosphonic ester or aminoalkane phosphinic ester, and then reacting this intermediate compound with another carbonyl compound $R^3—CHO$, preferably formaldehyde, and a second phosphorous or phosphonous acid ester compound. The corresponding symmetric or asymmetric chelate forming product may subsequently be obtained by saponification of the ester groups.

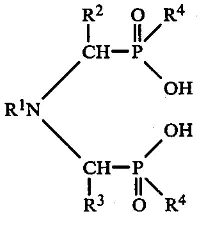

The synthesis of asymmetric imino-bis-methylene-phosphonic or -phosphonic acids may be represented, for example, by the following equations:

$$R^1—NH_2 + R^2—CHO \longrightarrow R^1—N=CH—R^2 \qquad (3)$$

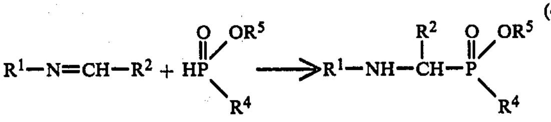

(4)

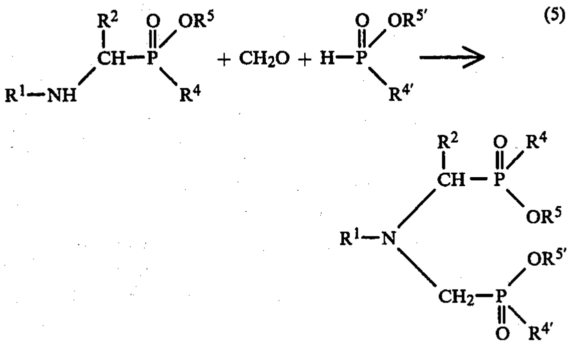

(5)

($R^{4'}$ has the same meaning as $R^4$)
($R^{5'}$ has the same meaning as $R^5$)

The imino-bis-methylene-phosphonic and -phosphinic acids used for the preparation of the nickel or copper-II chelates according to the present invention are known. The preparation thereof has been described, inter alia, in Houben-Weyl/XII/1, pages 486–488, and in the Articles by Petrov, Makljaev and Bliznjuk in Zhnr. Abstr. 54, 260 (1960) and by G. M. Kosolapof in J. Am. Chem. Soc. 67, 1180 (1945); also in U.S. Pat. No. 2,870,190.

The compounds are most conveniently prepared by the reaction of 1 mol of a primary amine with 2 mols of a carbonyl compound, preferably formaldehyde or benzaldehyde, and 2 mols of a phosphorous acid dialkyl ester or phosphonous acid dialkyl ester. The resulting N-substituted imino-bis-methylene phosphonic or -phosphinic acid ester may readily be saponified with mineral acids, in particular with hydrobromic or hydriodic acid.

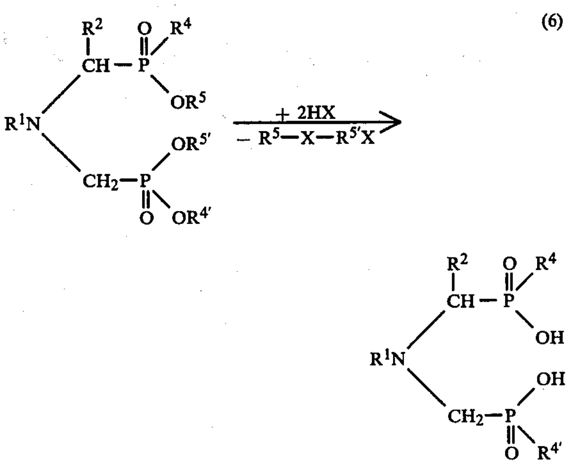

(6)

If $R^4$ and $R^{4'}$ in equations 1–6 represent an alkoxy group, the synthesis results in either a dibasic phosphonic acid group or a monobasic phosphinic acid monoester group, depending upon the hydrolysis conditions employed.

The starting materials for the imino-bis-methylene phosphonic acids and phosphinic acids according to the present invention are all well-known and technically readily available compounds. Thus, for example, the alkane phosphonous acid monoalkyl esters may be prepared simply and in high yields by acid saponification of the readily available dialkyl esters. Reference may be made in this connection to the article by K. Sasse in Houben-Weyl, Methoden der Organischen Chemie, XII/1, pages 294–231. Detailed instructions for individual syntheses may be found in M. Sander, Chem. Ber. 93, 1220 (1960) and K. A. Petrov. Zhnr. obszh. Khim. 31, 179 (1961).

The preparation of Compound 2 is described below as an example of the methods of synthesis employed.

N-octadecyl-imino-bis-methylene-phosphinic acid diisobutyl ester 100 g of a 30% formaldehyde solution were added dropwise, with stirring, to 134.5 g (0.5 mol) of n-octadecylamine and 122 g (1.0 mol) of methane phosphorous acid monoisobutyl ester at 20° C. Stirring was continued for a further 2 hours over a steam bath and the reaction mixture was then concentrated by evaporation under reduced pressure. The product is obtained as a pale yellowish oil.

N-octadecyl-imino-bis-methylenephosphinic acid (Compound 2)

The crude product obtained from the reaction described above was taken up with 600 ml of acetic acid and heated to 80° C., and 170 g of a 48% hydrobromic acid were added. The reaction mixture was refluxed for 6 hours and then cooled to room temperature. The mixture was partitioned between 800 ml of dichloromethane and 300 ml of water. The dichloromethane phase was separated and concentrated by evaporation. The mass crystallised when digested with acetonitrile. Yield: 162 g=72% of theoretical yield.

Preparation of the water-insoluble nickel and copper-II chelates according to the present invention is carried out by reaction of the imino-bis-methylene-phosphonic acids or imino-bis-methylene-phosphinic acids and nickel or copper-II salts in alcoholic solvents, optionally with the addition of auxiliary bases.

Two examples are given below to illustrate the preparation of the nickel and copper-II chelates according to the present invention.

Cu-II chelate of Compound 1

113 g of Compound 1 and 50 g of copper acetate hydrate in 800 ml of absolute ethanol were refluxed for 6 hours. The solution obtained was introduced into a mixture of 500 ml of dichloromethane and 500 ml of water, the dichloromethane phase was separated off and stirred into 1 l of acetonitrile, and the green precipitate was filtered off and washed with acetonitrile. Yield: 80 g=60% of theoretical yield.

$Cu_{calculated\ based\ on\ monohydrate}$ 11.9%. $Cu_{observed}$ 11.4%.

Nickel Chelate of Compound 1

45.5 g (0.1 mol) of Compound 1 were boiled with 25 g (0.1 mol) of nickel acetate tetrahydrate and 39 g of ethyl diisopropylamine in 200 ml of ethanol and the reaction mixture was refluxed for 4 hours. After concentration by evaporation under reduced pressure, the residue was partitioned between 300 ml of dichloromethane and 200 ml of water and the dichloromethane phase was separated off, dried with NaCl and concentrated by evaporation. Yield: 50 g of pale green powder.

Both the Cu-II chelate and the Ni chelate are readily soluble in ethyl acetate.

The Cu-II chelate of Compound 1 presumably corresponds to the following formula:

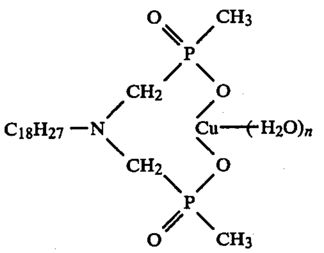

n ~ 1-3

The Ni-chelate of Compound 1 presumably corresponds to the following formula:

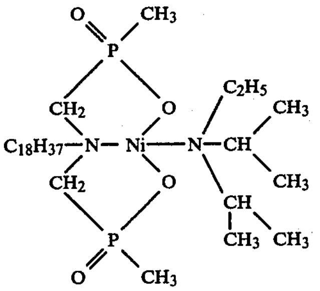

The incorporation of copper or nickel complexes of imino-bis-methylene-phosphinic or -phosphonic acids in photographic layers, e.g. in image receptor layers for use in the dye diffusion transfer process, has not hitherto been known and leads to surprising results.

Image receptor layers for use in the dye diffusion transfer process contain cationic, low molecular weight, micella forming or high molecular weight cationic mordants, either as solutions or in latex form, for fixing the image dyes, which are normally anionic.

It is known that anionic image dyes suffer a considerable loss in lightfastness when fixed to cationic mordants. The loss in lightfastness depends to a considerable extent on the structure of the cationic mordant and the form in which it is incorporated and it also depends in a manner which is difficult to foresee on the constitution of the fixed image dye.

In DE-A No. 2,740,719 it has been proposed to improve the lightfastness of image dyes fixed to cationic mordants by subsequently metallising them with transition metal ions.

Although this measure in many cases leads to a considerable improvement in the lightfastness, it is not generally successful and in many cases entails unforseeable disadvantages, e.g. discolouration of the layer.

It is also found that the speed of complex formation of the image dye depends to a large extent on the form in which the metal ions are incorporated in the image receptor layer. The metal ions present in the image receptor layer are in many cases bound in complex form to low molecular weight or high molecular weight, so-called metal donors incorporated in the layer (e.g. DE-A No. 3,002,287). As the stability of the metal donor complex present in the image receptor layer increases, the speed of complex formation of the image dye drastically decreases so that the colour change to the final image shade which accompanies complex formation of the image dye is not completed within the time provided for formation of the image.

The cause for the improvements achieved with the present invention is not known in detail. The fact that the observed improvements in lightfastness are also obtained with image dyes which do not form metal complexes. is most likely due to a singlet-oxygen absorbing action of the metallizing agents according to the present invention. In addition, it may be assumed that the components have a general triplet inactivating action.

The following literature may be referred to in this connection: J. Griffiths, C. Hawkins, J. Chem. Soc. Perkin Trans. II 1977, pages 747–752; J. Chem. Soc. Chem. Commun. 1972, p. 463–463; H. Kautsky, H. de Bruin, Natur-Wiss. 19 (1931) 1043, H. Kautsky et al., Ber. dt. chem. Ges. 66, 1588 (1933); P. B. Merkel, W. F. Smith, J. Phys. Chem. 84, 2834–40 (1979).

The use of nickel chelates to stabilize photographic colour images has been repeatedly described. DE-A No. 2,853,826, for example, describes the use of nickel chelates of thioamides of the picolinic acid or quinaldic acid series to stabilize dyes against light. The considerable self-colour of the nickel chelates described there would result in prohibitive discolouration of the image whites when present in proportions of only 5 mMol/$m^2$ of image receptor layer.

Only those copper or nickel complexes are suitable for use in image receptor layers for the dye diffusion transfer process which do not discolour the image receptor layer to densities above 0.07, measured behind blue, green or red filters, when present in quantities of 50 mMol/$m^2$.

The copper or nickel complexes described may be used by a wide variety of methods to incorporate copper-II or nickel ions in a diffusion-fast form in layers without loss of reactivity with complex-forming dyes. Thus, the complexes may be mixed with binders, such as gelatine, polyvinyl alcohol, cellulose derivatives or polyacrylamides, and used in the form of these mixtures to prepare transparent layers.

The Cu-II or Ni complexes described are also suitable metal donors for incorporation in photographic layers in which a uniform or imagewise colouration is to be produced by reaction of the complex bound metal ions with other, colourless or coloured, organic colour-forming complex formers. Uniform colouration may be used, for example, if an unwanted image produced in the course of development of an integral photographic recording material is required to be rendered invisible after imagewise exposure, for example if a negative colour image retained in the light-sensitive element is to be eliminated when a positive colour image is to be produced in the image receptor layer. The complexes described above, are, however, advantageously used in combination with an image receptor layer which together with a layer support constitutes a so-called image receptor element. Such an image receptor element may form an integral component of a multi-layered light-sensitive colour photographic recording material, in which case it may either remain joined to the light-sensitive element after development or it may be separated therefrom. Alternatively, the image receptor element may initially be present as a separate, light-insensitive photographic material which is only brought into contact with the light-sensitive recording material in the course of processing of the latter and may subsequently be separated therefrom.

The dye absorbent layers according to the present invention are hydrophilic layers containing a water-insoluble, preferably electroneutral, Cu-II or Ni complex of a compound corresponding to general formula I in the form of a finely divided dispersion optionally containing oil-former. The dye absorbent layers may also contain mordants for diffusible anionic dyes or they may be in direct contact with mordant layers.

The mordants used for the anionic image dyes may in principle be various known cationic, low molecular weight or high molecular weight mordants, e.g. quaternary ammonium or phosphonium salts containing at least one long chain alkyl or aralkyl group, water-soluble quaternized polyurethanes or polyureas, or cross-linked latices containing quaternary salt groups. Reference may be made in this connection, for example, to the polyurethanes containing cationic glycidyl groups mentioned in DE-A No. 2,631,521.

Combination of a cationic polyurethane of the last-mentioned type (DE-A No. 2,631,521) with a hydrophobic copper-II or nickel chelate according to the present invention may be used to obtain dye absorbent layers having considerable advantages, particularly with regard to the high level of lightfastness thereof and the clear colour tone of the transferred dyes, if the dye absorbent layer is used as image receptor layer for the preparation of dye transfer images.

To prepare the dye absorbent layers according to the present invention, the hydrophobic copper-II or nickel chelates are incorporated in a layer in a dispersed form in the presence of a hydrophilic binder, preferably gelatine. The dispersions used for this purpose are prepared in known manner and preferably contain a neutral oil-former, e.g. N,N-diethyl-lauric acid amide, tricresyl phosphate, dibutyl phthalate or esters of polyhydric alcohols with long chain fatty acids.

The oil-former content may be from 10 to 200%, by weight, based on the Cu-II or Ni chelate.

The image receptor elements may be hardened in the conventional manner to improve the scratch resistance thereof and to limit the absorption of liquid during processing with an alkaline medium.

The stability of the nickel chelates incorporated in a dispersed form is sufficient to ensure that during prolonged storage there will be no migration of free Cu-II or Ni ions into the hydrophilic binder phase from which they could diffuse right over to an incorporated dye releasing compound, which would result in a loss of diffusibility and of photographic sensitivity.

The hydrophobic copper-II or nickel chelates are therefore particularly suitable for the preparation of integral monosheet materials or single sheet materials in which the image receptor element is combined to form a self-contained unit with the layers of the light-sensitive element from which it may be separated only by an opacifying layer used for optical separation.

The photographic material according to the present invention comprising the dye absorbent layer containing the above-described chelates is suitable as image receptor material for various types of photographic dye diffusion transfer process in which diffusible image dyes or diffusible dye formers (image dye precursors) carrying substituents capable of chelate formation are used or released imagewise to be transferred to an image receptor layer. When transfer has been completed, such a photographic material therefore contains an imagewise distribution of one or more such dyes in the image receptor layer.

According to one advantageous embodiment of the present invention, the photographic material may, in addition to the image receptor element containing the described (hydrophobic) copper-II or nickel complexes, comprise a light-sensitive element in the form of a sheet which has at least one layer containing a preferably acid dye or a corresponding precursor compound and at least one light-sensitive layer, in particular a light-sensitive silver halide emulsion layer. The above-mentioned dyes and dye precursor compounds will hereinafter be summarily referred to as colour-providing compounds. The photographic material containing the image receptor layer with the copper-II or nickel complexes according to the present invention may also contain several light-sensitive silver halide emulsion layers of differing spectral sensitivities and additional light-insensitive layers, such as intermediate layers, covering layers and other layers performing various functions of the type customarily used in multi-layered colour photographic recording materials.

Photographic materials containing an image receptor layer with copper-II or nickel complexes according to the present invention, i.e. image receptor materials and in particular colour photographic recording materials containing such an image receptor material as an integral constituent, may in addition contain acid layers and so-called retarding layers which together form a so-called combined neutralisation system. Such a neutralisation system may be arranged in known manner between the layer support and the image receptor layer on it or it may be arranged in some other position in the combination of layers, e.g. above the light-sensitive layers, i.e. on the far side of these light-sensitive layers, as seen from the image receptor layer.

The neutralisation system is normally orientated so that the retarding layer is situated between the acid layer and the position where the alkaline developer liquid or paste comes into action. Such acid layers, retarding layers and neutralisation layers consisting of both these layers have been disclosed, for example, in U.S. Pat. No. 2,584,030, U.S. Pat. No. 2,983,606, U.S. Pat. No. 3,362,819, U.S. Pat. No. 3,362,821, DE-A No. 2,455,762, DE-A No. 2,601,653, DE-A No. 2,652,464, DE-A No. 2,716,505 and DE-A No. 2,816,878. Such a neutralisation system may, as is known, contain two or more retarding layers.

According to a particular embodiment, the photographic material may also contain one or more pigmented, opaque layers which are permeable to aqueous liquids. These layers may fulfil two functions. Firstly, they may prevent unwanted access of light to light-sensitive layers; and, secondly, the pigmented layer, in particular when the pigment is light or white, e.g. $TiO_2$, may be used to form an aesthetically pleasing background to the colour image produced. Integral colour photographic recording materials containing such a pigment layer have been disclosed, for example, in U.S. Pat. No. 2,543,181 and DE-A No. 1,924,430.

Instead of using preformed opaque layers, means may be provided for producing such a layer in the course of the development process. In accordance with the two functions mentioned above, such pigment layers may consist of two or more part layers, one of which, for example, may contain a white pigment while the other, for example, may cotnain a dark, light-absorbent pigment, such as carbon black.

In a particularly preferred embodiment of the present invention, the photographic material is an integral colour photographic recording material for carrying out the dye diffusion transfer process and may have, for example, the following layer elements:

(1) a transparent layer support;
(2) an image receptor layer;
(3) a light-impervious layer (pigment layer);
(4) a light-sensitive element comprising at least one light sensitive silver halide emulsion layer and at least one colour-providing compound associated therewith;
(5) a retarding layer;
(6) an acid polymer layer;
(7) a transparent layer support.

The composition of this material may be such that two different parts are prepared separately from each other, namely the light-sensitive part (layer elements 1 to 4) and the cover sheet (layer elements 5 to 7) and these two parts may then be placed with the active surfaces thereof in contact and joined together, optionally using spacer strips to leave space between the two parts to receive an accurately calculated quantity of a developer liquid. Layer elements 5 and 6, which together constitute the neutralisation system, may also be arranged, albeit in reverse sequence, between the layer support and the image receptor layer of the light-sensitive part.

Means may be provided for introducing a developer liquid between two adjacent layers of the integral recording material, e.g. in the form of a laterally placed container which can be split open and which when subjected to mechanical forces releases its contents between two adjacent layers of the recording material, in the present case between the light-sensitive part and the cover sheet.

In an integral recording material, the light-sensitive element may also be an essential constituent of the photographic material according to the present invention. If the photographic material according to the present invention is not light-sensitive, but consists basically of layer support and image receptor layer it is brought into contact with the light-sensitive element of a light-sensitive recording material during the development process. In the case of a single dye transfer process, the light-sensitive element contains a light-sensitive silver halide emulsion layer and a colour-providing compound associated therewith. In this arrangement, the colour-providing compound may be situated in a layer adjacent to the silver halide emulsion layer or it may be present in the silver halide emulsion layer. In the latter case, the image dye is preferably chosen so that the predominant absorption range of the colour-providing compound does not coincide with the predominant range of sensitivity of the silver halide emulsion layer. In order to obtain multi-coloured transfer images with faithful colour reproduction, however, the light-sensitive element contains three such associations of colour-providing compound with light-sensitive silver halide emulsion layer, and the absorption range of the image dye obtained from the colour-providing compound as a rule substantially corresponds to the range of spectral sensitivity of the associated silver halide emulsion layer. For obtaining the highest possible sensitivity, however, it is advantageous if the colour-providing compound is arranged in each case in a separate layer of binder situated behind the silver halide emulsion layer viewed in the direction of the incident light used for exposure) or if it has an absorption different from that of the image dye ("shifted image dyes"—U.S. Pat. No. 3,854,945). An adsorption shift in the image receptor layer is generally obtained by complex formation with the copper-II or nickel ions present there if dyes containing substituents capable of chelate formation are used. Colour-providing compounds containing such dye residues have been described, for example, in U.S. Pat. No. 3,081,167 and DE-A No. 2,740,719.

The colour-providing compounds may be coloured compounds capable of diffusion which begin the diffuse when the layers are treated with an alkaline processing liquid and are fixed by development only in the exposed areas, or they may be diffusion resistant substances which release a diffusible dye in the course of development.

Colour-providing compounds which are diffusible from the start have been disclosed, for example, in DE-C Nos. 1,036,640; 1,111,936 and 1,196,075. The so-called dye developers described there contain, in one and the same molecule, a dye residue and a group which is capable of developing exposed silver halide.

Among the hitherto known processes for the production of colour photographic images by the dye diffusion transfer process, those based on the use of colour-providing compounds incorporated in a diffusion-fast form from which diffusible dyes or dye precursor products are released imagewise in the course of development and transferred to an image receptor layer have recently become increasingly important. Such non-diffusible colour-providing compounds (dye releasers) have been described, for example in the following documents: U.S. Pat. No. 3,227,550, U.S. Pat. No. 3,443,939, U.S. Pat. No. 3,443,940, DE-A No. 1,930,215, DE-A No. 2,242,762, DE-A No. 2,402,900, DE-A No. 2,406,664, DE-A No. 2,505,248, DE-A No. 2,543,902, DE-A No. 2,613,005, DE-A No. 2,645,656, DE-A No. 2,809,716 BE-A No. 861,241.

The above-mentioned documents describe both dye releasers which produce negative colour images when conventional negative silver halide emulsions are used and those which produce positive colour images from negative silver halide emulsions. If positive colour images are required in the former case, it is necessary either to use direct positive silver halide emulsions or to apply one of the known reversal processes, e.g. one based on the silver salt diffusion process (U.S. Pat. No. 2,763,800) or on the use of compounds which release development inhibitors as a result of development.

When the image receptor elements according to the present invention are used, the dye releasers preferably contain substituents capable of complex formation in the dye residue. These compounds include in particular the azo dyes which contain chelate forming substituents, such as OH, NHR or ring nitrogen atoms in a position adjacent to the azo bond. Colour-providing compounds containing such dye residues have been described, for example, in Research Disclosure Publications No. 17334 (September 1978) and No. 18022 (April 1979) and in U.S. Pat. No. 3,081,167, DE-A No. 2,740,719, DE-A No. 3,107,540, DE-A No. 3,115,648 and DE-A No. 3,117,243, but it has surprisingly been found that an equally stabilizing effect is obtained from using dye releasers which do not contain dyes capable of post-complex formation.

Example of practical application 1

Various image receptor sheets were prepared by applying the following layers in succession to a polyethylene-laminated paper support (quantities per m²):

Image receptor sheet 1 (according to the present invention)

Layer 1
- 4 g of gelatine
- 1.9 g of Cu-II chelate of Compound 1
- 0.03 g of saponin Layer 2
- 4 g of cationic polyurethane according to Example 3 of DE-A No. 2,631,521
- 5 g of gelatine
- 0.02 g of saponin Layer 3
- 0.1 g of gelatine
- 0.2 g of instant hardener corresponding to the formula:

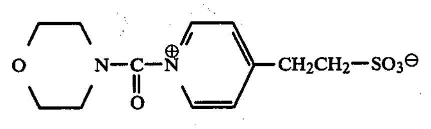

A smooth layer having a pale bluish surface is obtained. The optical density measured behind a red filter. is 0.08.

Image receptor sheet 2 (according to the present invention)

Layer 1
- 4 g of gelatine
- 2.5 g of nickel chelate of Compound 1
- 2.8 g of tricresyl phosphate and
- 0.03 g of saponin Layers 2 and 3

Similar to the corresponding layers in image receptor sheet 1.

A smooth image receptor layer having a pale green surface is obtained. The optical density measured behind a red filter is 0.04.

Image receptor sheet 3 (according to the present invention)

Layer 1
- 8 g of gelatine
- 4 g of cationic polyurethane according to Example 3 of DE-A No. 2,631,521
- 2 g of copper-II chelate of Compound 2
- 2.5 g of tricresyl phosphate and
- 0.05 g of saponin Layer 2

Same as Layer 3 of image receptor sheet 1.

A smooth image receptor sheet having a pale bluish surface is obtained. Density behind red filter: 0.08.

Image receptor sheet 3 demonstrates that the introduction of copper-II chelate according to the present invention and cationic mordant into a single layer may be achieved without technical difficulties in casting and without loss of quality.

Image receptor sheet 4 (Comparison)

Same as image receptor sheet 1 without layer 1.

0.03 molar solutions were prepared from the following image dyes which are capable of post-complex formation, and the solutions were made alkaline with 1% NaOH.

Dye A

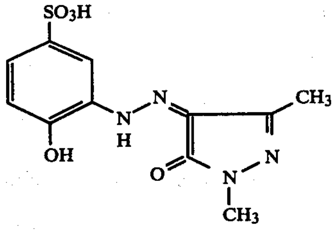

Dye B

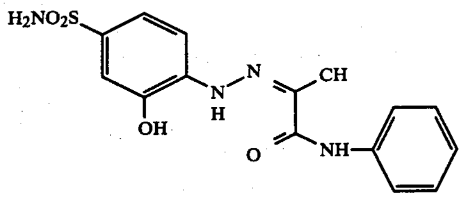

Dye C

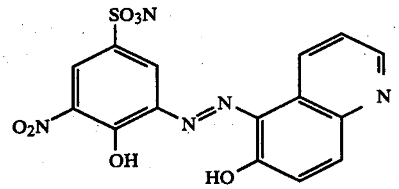

Dye D

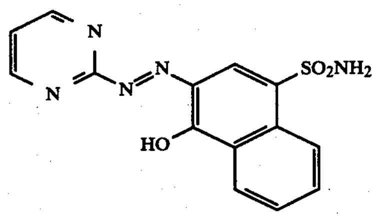

Dye E

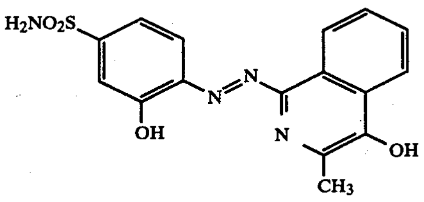

Dye F (Dye 13 of DE-A 3,107,540)

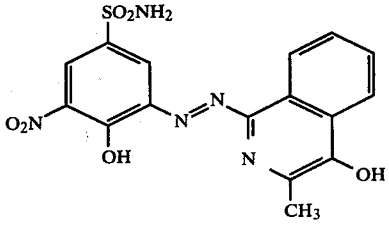

Dye G (Dye 13 of DE-A 3,115,648)

-continued

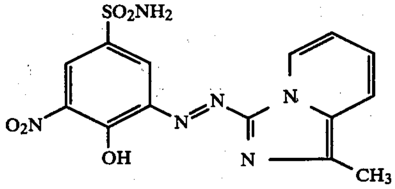

Into each of these solutions were immersed one strip of image receptor sheets to 1 to 3 (according to the present invention) and two strips of image receptor sheet 4 (comparison material free from metal donor) until the optical density measured behind a filter of the complementary colour had reached a value of from 1.3 to 1.5 on image receptor sheets 1 to 3. The comparison strips in which the transferred dye was not metallised were subjected to post-complex formation by a subsequent after-treatment for 30 seconds with a 2% solution of copper acetate or nickel acetate.

The strips were then after-treated for one minute with a 2% sodium succinate solution which was adjusted to pH 6, and the strips were then dried.

Interpretation of the results shows that the colour tones obtained on image receptor sheets 1 to 3 agree with those of the corresponding strips of image receptor sheet 4 and moreover were obtained while the sheets were still moist. The colour change in the change from wet to dry was negligible.

No brown discolouration occurs. Complex formation is instantaneous and no gradual colour change is observed.

To test for lightfastness, one strip of each of the image receptor sheets 1, 2 and 4 carrying transfers of the dyes D to G was subjected to high intensity exposure in a Xeno test apparatus for 48 hours. The percentage loss in density determined after $4.8\times10^6$ Lux hours, based on the initial density of 1.5, are summarized in Table 1 below:

TABLE

| | Density loss (%) | | | |
|---|---|---|---|---|
| Image receptor sheet | D | E | F | G |
| 1 | 4 | 17 | 19 | 25 |
| 4 (Cu) | 55 | 46 | 37 | 35 |
| 2 | 8 | 52 | 49 | 35 |
| 4 (Ni) | 14 | 46 | 56 | 38 |

From the results it may be concluded that the lightfastness of dye transfers obtained from anionic dyes capable of post-complex formation may be improved by metallization with hydrophobic copper-II or nickel chelates according to the present invention.

We claim:

1. A photographic material comprising a layer support;

a layer arranged on said layer support which is dyeable by organic dyes and contains as a metalizing agent for the formation of organic dye-metal complexes a water-insoluble nickel complex or copper-II complex formed from a compound corresponding to the following general formula I:

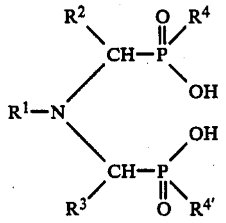

wherein $R^1$ represents a hydrocarbon group having up to 30 carbon atoms optionally interrupted by —O—;

$R^2$,$R^3$ represents H, alkyl having up to 5 carbon atoms or aryl having from 6 to 10 carbon atoms;

$R^4$,$R^{4'}$ represents alkyl or alkoxy having from 1 to 4 carbon atoms, aralkyl or OH.

2. The material as claimed in claim 1 wherein in formula I $R^1$ represents alkyl, cycloalkyl, aralkyl or aryl.

3. The material as claimed in claim 1, wherein in formula I that $R^3$ represents H or $R^2$ when $R^2$ represents alkyl or aryl.

4. The material as claimed in claim 1 wherein the dye absorbent layer contains a mordant for diffusible anionic dyes or is in direct contact with a suitable layer of mordant.

5. A photographic material comprising:

a layer support;

a supported image receptor element for dye diffusion process comprising a layer capable of being dyed by organic dyes and containing as metalizing agent for the formation of organic dye-metal complexes a water insoluble nickel complex or copper-II complex formed from a compound corresponding to the following formula I:

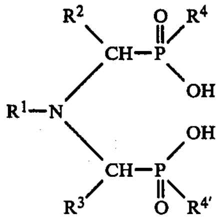

wherein $R^1$ represents a hydrocarbon group having up to 30 carbon atoms optionally interrupted by —O—;

$R^2$,$R^3$ represents H, alkyl having up to 5 carbon atoms or aryl having from 6 to 10 carbon atoms;

$R^4$,$R^{4'}$ represents alkyl or alkoxy having from 1 to 4 carbon atoms, aralkyl or OH.

6. The material as claimed in claim 5 wherein the image receptor element containing the dye absorbent layer is an integral constituent of a multilayered-light-sensitive colour photographic recording material.

* * * * *